(12) United States Patent
Menard et al.

(10) Patent No.: US 8,773,238 B2
(45) Date of Patent: Jul. 8, 2014

(54) MEDIA RECOGNITION AND SYNCHRONISATION TO A MOTION SIGNAL

(75) Inventors: Jean-Francois Menard, Boucherville (CA); Pierre-Anthony Stivell Lemieux, San Mateo, CA (US)

(73) Assignee: D-Box Technologies Inc., Longueuil (CA)

( * ) Notice: Subject to any disclaimer, the term of this patent is extended or adjusted under 35 U.S.C. 154(b) by 527 days.

(21) Appl. No.: 13/180,923

(22) Filed: Jul. 12, 2011

(65) Prior Publication Data

US 2012/0019352 A1    Jan. 26, 2012

Related U.S. Application Data

(60) Provisional application No. 61/366,301, filed on Jul. 21, 2010.

(51) Int. Cl.
*G09B 9/00* (2006.01)
(52) U.S. Cl.
USPC .................. 340/4.2; 472/130; 472/59; 434/55
(58) Field of Classification Search
CPC ...................... H04N 21/4307; A63F 2300/302; G09B 9/00
USPC ........................ 340/4.2; 472/130, 59; 434/55
See application file for complete search history.

(56) References Cited

U.S. PATENT DOCUMENTS

| | | | |
|---|---|---|---|
| 5,768,122 A * | 6/1998 | Motoc | 700/50 |
| 2002/0115043 A1 * | 8/2002 | Baker et al. | 434/30 |
| 2004/0015983 A1 * | 1/2004 | Lemmons | 725/12 |
| 2006/0041753 A1 | 2/2006 | Haitsma | |
| 2006/0075237 A1 | 4/2006 | Seo et al. | |
| 2008/0263620 A1 * | 10/2008 | Berkvens et al. | 725/136 |
| 2010/0061405 A1 * | 3/2010 | Berkvens et al. | 370/503 |
| 2010/0225810 A1 * | 9/2010 | Berkvens et al. | 348/500 |

FOREIGN PATENT DOCUMENTS

WO    WO 02/065782 A1    8/2002

* cited by examiner

*Primary Examiner* — Andrew Bee
(74) *Attorney, Agent, or Firm* — Norton Rose Fulbright Canada LLP

(57) ABSTRACT

The present document describes a device and method for synchronizing a motion signal corresponding to a media content with a media signal for the media content, the motion signal being for controlling a motion feedback system. The method comprises: receiving a portion of the media signal; obtaining a fingerprint corresponding to the received portion of the media signal; from reference fingerprints associated with time positions of at least one reference media content, identifying a reference time position of the media content corresponding to the obtained fingerprint; obtaining the motion signal associated with the identified reference time position of the media content; and outputting the motion signal synchronized with the media signal using the identified reference time position of the media content for controlling the motion feedback system.

17 Claims, 3 Drawing Sheets

MEDIA RECOGNITION AND SYNCHRONISATION TO A MOTION SIGNAL

CROSS-REFERENCE TO RELATED APPLICATIONS

The present application claims priority of U.S. provisional application 61/366,301 filed Jul. 21, 2010 and entitled "MEDIA RECOGNITION AND SYNCHRONISATION TO A MOTION SIGNAL", the content of which is incorporated herein by reference.

TECHNICAL FIELD

This description relates to the field of media recognition and synchronization. More particularly, this description relates to methods and devices for playing video and audio stream media in synchronization with a motion signal.

BACKGROUND

In controlling motion feedback systems for use in public, commercial or home environments, the challenge is in the synchronization of a motion signal for gaming, feature length movies, amusement park rides, virtual reality, etc. with audio or video signals during playback, such that the motion signalis delivered to motion feedback systems in time for the platform movement to match the reproduced audio-visual signals. The required tolerance in usually in the order of milliseconds.

In some applications, the motion signal is not transmitted synchronously with audio or video signals; the playback device must retrieve the motion signal separately, and synchronize them for playback with the audio or video signals. If the identity of the audio or video signals and position in time within the audio or video signals can be readily and accurately identified through metadata in the audio or video signals, the playback device may use this information to retrieve and synchronize the appropriate motion signal. If such metadata is not available, then another solution is required.

There is therefore a need for an improved synchronization method and device which addresses the above-noted challenges.

SUMMARY

The present disclosure therefore provides a motion signal synchronization method and device that overcomes or mitigates one or more disadvantages known to be associated with the prior art, or at least provides a useful alternative.

The proposed approach is based on a technique commonly referred to as media fingerprinting. This technique enables media recognition by way of deriving unique identifiers, which are typically referred to as media fingerprints, from particular media content. The correspondence between particular media fingerprints and particular media content is then used for identification purposes. For example, the recognition of audio and video content exploits acoustic and visual features to identify particular corresponding acoustic and video media respectively. Known media fingerprinting techniques are described in the following patent references: WO2002065782 (Philips), US20060041753 (Philips), and US20060075237 (Philips).

In light of the above media fingerprinting technique, the motion signal synchronization herein proposed employs media fingerprinting to recognize a given portion of an audio or video signal, to which is then associated a given motion signal for use during playback.

It was found that applying media fingerprinting techniques to identify a reference time position of the media content (e.g., the time position in a movie which is presently being read or played) and then obtain the motion signal which corresponds to this reference time position provides a satisfactory result since the media content and the motion signal can then be outputted synchronously. This combination provides a simpler, more precise, more robust, more stable, less expensive, more fault-tolerant solution that those described in the prior art for synchronizing a motion signal with a media signal. In contrast to prior art method, this method is completely independent of the method used for encoding, compressing or packaging the audio signal. Because this method relies on the acoustic characteristics of the audio signal, it can be made resilient to changes in the pitch, speed or amplitude thereof.

Motion feedback systems are meant to include motion platforms, motion actuators, motion simulator, vibrotactile transducers, and inertial shakers.

Motion platforms are meant to include any platform or seating arrangement to which motion is induced by actuators and on which a person is installed. Motion platform applications include, but are not limited to, gaming, feature length movies, amusement park rides, virtual reality, etc. An example of a motion platform include seat or chair for one or more persons on which are mounted one or more actuators which interface with the ground. Another example would be a platform for receiving a seat, chair or other device accommodating a user, and on which are mounted one or more actuators which interface with the ground.

Motion codes, a motion code signal or a motion code stream contain motion effects, based on the content meant to be reproduced to the viewer. In most cases, the motion signals are prepared by motion designers. In other cases, the motion signals or portion thereof are generated automatically.

A media signal is to be understood as comprising an audio signal and/or a video signal.

An audio signal or an audio stream is to be understood as encompassing sound information meant to be reproduced to the during the presentation, such as the sound track of games, feature length movies, amusement park rides, virtual reality environments, etc. An example of an audio signal or an audio signal is encoded Pulse Code Modulation (PCM) samples.

A video signal or a video stream is to be understood as encompassing visual information meant to be reproduced to the user, such as the main picture of games, feature length movies, amusement park rides, virtual reality environments, etc. An example of a video signal or a video signal is an MPEG-4 Part 10 video elementary stream.

Media content is meant to include games, feature length movies, amusement park rides, virtual reality environments, advertisements, etc.

Feature length movies are those intended to be shown in movie theaters or home theaters. They last generally more than 30 minutes and have separate video and audio tracks to which a motion signal, a stream of motion codes or a motion code track can be associated.

According to an embodiment, there is provided a method for synchronizing a motion signal corresponding to a media content with a media signal for the media content, the motion signal for controlling a motion feedback system, the method comprising: receiving a portion of the media signal; obtaining a fingerprint corresponding to the received portion of the media signal; from reference fingerprints associated with time positions of at least one reference media content, identifying a reference time position of the media content corresponding to the obtained fingerprint; obtaining the motion signal associated with the identified reference time position of the media content; and outputting the motion signal synchronized with the media signal using the identified reference time position of the media content for controlling the motion feedback system.

According to another embodiment, there is provided a method for determining if a motion signal corresponding to a media content is synchronized to a media signal for the media content, the motion signal for controlling a motion feedback system, the method comprising: receiving a portion of the media signal; obtaining a fingerprint of the received portion of the media signal, namely an obtained fingerprint; retrieving a fingerprint of the portion of the media signal at a reference time position of the media content, namely a reference fingerprint; comparing the obtained fingerprint and the reference fingerprint; based on the comparing, determining if the motion signal is synchronized to the media signal; and according to the determining, outputting the motion signal synchronized with the media signal for controlling the motion feedback system.

According to another embodiment, there is provided a device for synchronizing a motion signal corresponding to a media content with a media signal for the media content, the device having access to a storage medium which comprises reference fingerprints associated with time positions of at least one reference media content, the motion signal for controlling a motion feedback system, the device comprising: an input unit for receiving a portion of the media signal; a processing device in communication with the input unit and the storage medium; and a memory accessible by the processing device, the memory storing instructions for implementing the processing device to: obtain a fingerprint corresponding to the received portion of the media signal; from reference fingerprints associated with time positions of at least one reference media content, identify a reference time position of the media content corresponding to the obtained fingerprint; obtain the motion signal associated with the identified reference time position of the media content; and output the motion signal synchronized with the media signal using the identified reference time position of the media content for controlling the motion feedback system.

According to another embodiment, there is provided a non-transitory computer readable memory having recorded thereon statements and instructions for execution by a computer to carry out a method for synchronizing a motion signal corresponding to a media content with a media signal for the media content, the motion signal for controlling a motion feedback system, the method comprising: receiving a portion of the media signal; obtaining a fingerprint corresponding to the received portion of the media signal; from reference fingerprints associated with time positions of at least one reference media content, identifying a reference time position of the media content corresponding to the obtained fingerprint; obtaining the motion signal associated with the identified reference time position of the media content; and outputting the motion signal synchronized with the media signal using the identified reference time position of the media content for controlling the motion feedback system.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
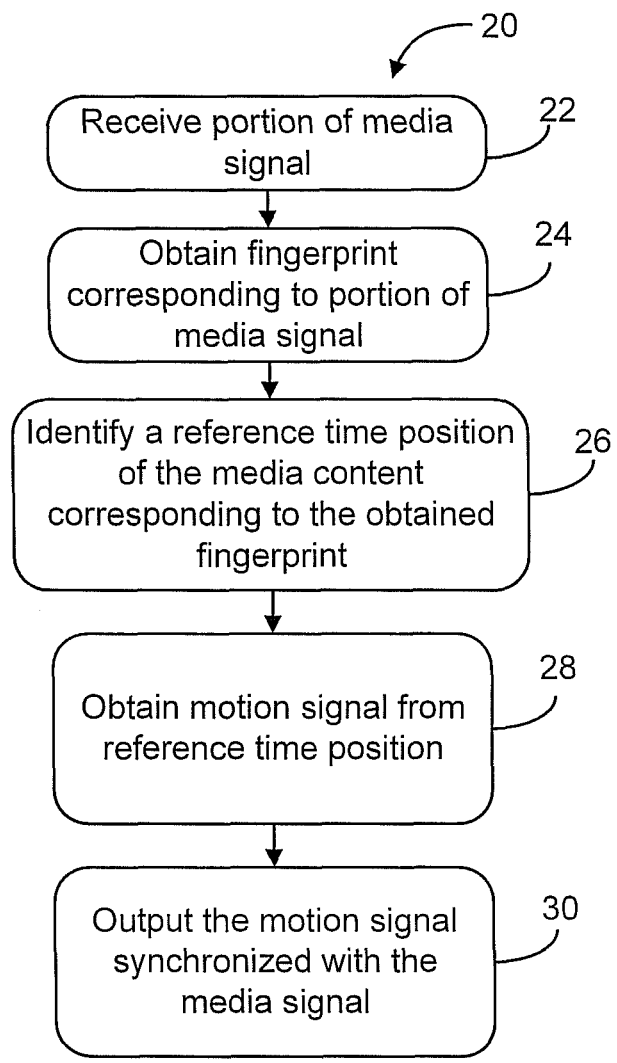
FIG. 1 is a flowchart of a method for synchronizing a motion signal to an audio signal, in accordance with an embodiment.

Referring now to the drawings, and more particularly to FIG. 1, there is illustrated an embodiment of a method 20 for synchronizing a motion signal corresponding to a media content, for example from a feature length movie or amusement park rides, with a media signal for the media content. The motion signal is for controlling a motion feedback system. According to an embodiment, the media signal is an audio signal and/or a video signal.

In step 22, a portion of the media signal is received. In step 24, a fingerprint corresponding to the received portion of the media signal is obtained.

According to an embodiment, the step of obtaining a fingerprint corresponding to the received portion of the media signal (step 24) comprises computing the fingerprint of the received portion of the media signal. In the computing the fingerprint step, the fingerprint of the portion of media signal may be generated as a code that uniquely corresponds to a waveform of the media signal. Upon generating such a unique code (i.e., a coded identifier), the corresponding waveform of the media signal from which the fingerprint was generated is thereafter identifiable by referencing to its fingerprint as described herein.

In step 26, from reference fingerprints associated with time positions of at least one reference media content, a reference time position of the media content corresponding to the obtained fingerprint is identified.

More specifically, in one embodiment of step 26, a database (aka a storage medium) of coded identifiers for the fingerprints for the media signal at the multiple playback time positions is consulted. The fingerprint of the portion of the media signal is matched to a reference fingerprint associated to the reference time position within the media content.

According to an embodiment, the identifying a reference time position of the media content (step 26) takes place on a remote networked server (not shown).

According to an embodiment, method 20 further comprises receiving the identity of one reference media content of the at least one reference media content to which the media signal corresponds prior to the identifying a reference time position of the media content (step 26). The step of identifying the reference time position of the media content is performed using reference fingerprints associated with time positions of the identified reference media content.

Method 20 may further comprises receiving at least one reference fingerprint associated with the outputted motion signal and stopping the output of the motion signal when the obtained fingerprint does not match any of the at least one reference fingerprint.

In another embodiment of step 24, the obtaining the fingerprint comprises retrieving the coded identifier for the fingerprint of the portion of the media signal at the reference time position directly from the motion signal.

In step 28, the motion signal associated with the identified reference time position of the media content is obtained. According to an embodiment, the motion signal associated with the identified reference time position of the media content is obtained from a remote networked server (not shown).

According to an embodiment of step 28, the identifying the current playback time position comprises continuously performing the obtaining a fingerprint, the identifying a reference time position, and the obtaining the motion signal steps to keep outputting the motion signal synchronized with the media signal, thereby ensuring continuous synchronization of the motion signal.

According to another embodiment of step 28, the identifying the current playback time position comprises performing the obtaining a fingerprint, the identifying a reference time position, and the obtaining the motion signal at a given frequency to resynchronize the outputting the motion signal with the media signal.

The reference time position refers to the location of the media signal within the at least one media content which is identified as corresponding to media content which is currently being played (corresponding to the obtained fingerprint) on either one of the speakers (for audio), the screen or display (for video) and the motion feedback system (for motion).

Step 30 involves outputting the motion signal, using the identified reference time position of the media content, synchronized with the media signal. The motion signal is eventually sent to a motion feedback system having actuators for moving the motion feedback system according to the motion signal.

According to an embodiment, method 20 further comprises receiving a motion signal corresponding to the media content prior to the identifying a reference time position of the media content (step 26), wherein the reference fingerprints are retrieved directly from the received motion signal.

According to an embodiment, the synchronized motion signal is stored in a storage device for eventually being sent to the motion feedback system.

The method 20 is performed, in one example, in real-time, as the media signal is being played.

Still according to another embodiment, method 20 further comprises receiving at least one reference fingerprint associated with the outputted motion signal and stopping the output of the motion signal when the obtained fingerprint does not match any of the at least one reference fingerprint.

Figure 2:
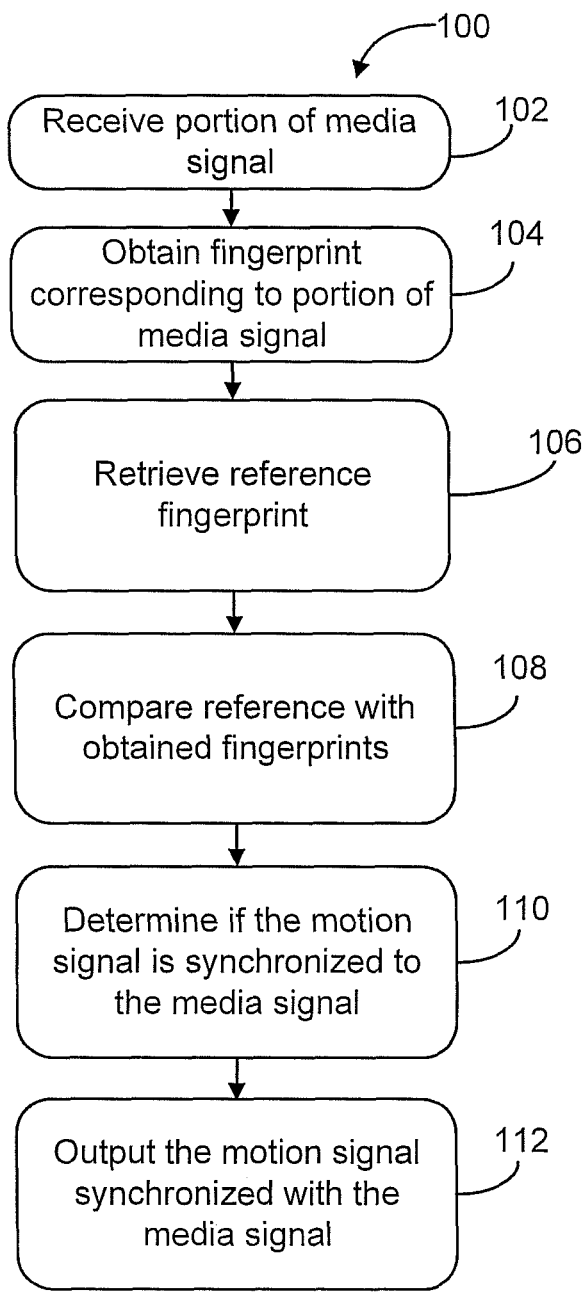
FIG. 2 is a flowchart which illustrates an embodiment of a method for determining if a motion signal corresponding to a media content is synchronized to a media signal for the media content.

FIG. 2 illustrates an embodiment of a method 100 for determining if a motion signal corresponding to a media content is synchronized to a media signal for the media content.

In step 102, a portion of the media signal is received. In step 104, a fingerprint of the media signal for the current playback time position is obtained (i.e., an obtained fingerprint).

In step 106, a fingerprint of the portion of the media signal at a reference time position of the media content is retrieved based on the current position within the motion signal, namely a reference fingerprint.

In step 108, the reference fingerprint of step 106 is compared with the obtained fingerprint of step 104. In step 110, based on the comparing, it is determined if the motion signal is synchronized to the media signal If the two fingerprints differ, the motion signal and media signal are not synchronized. This can occur, for instance, if the position within the motion signal changes abruptly, such as during a fast-forward or chapter-skip operation. The system may automatically choose as a result to apply method 20 to recover synchronization.

In another embodiment of step 104, the obtaining the fingerprint comprises retrieving the coded identifier for the fingerprint of the portion of the media signal at the reference time position directly from the motion signal.

In step 112, the motion signal synchronized with the media signal using the identified reference time position of the media content for controlling the motion feedback system is outputted according to the result of the determining if the motion signal is synchronized with the media signal (step 110).

Figure 3:
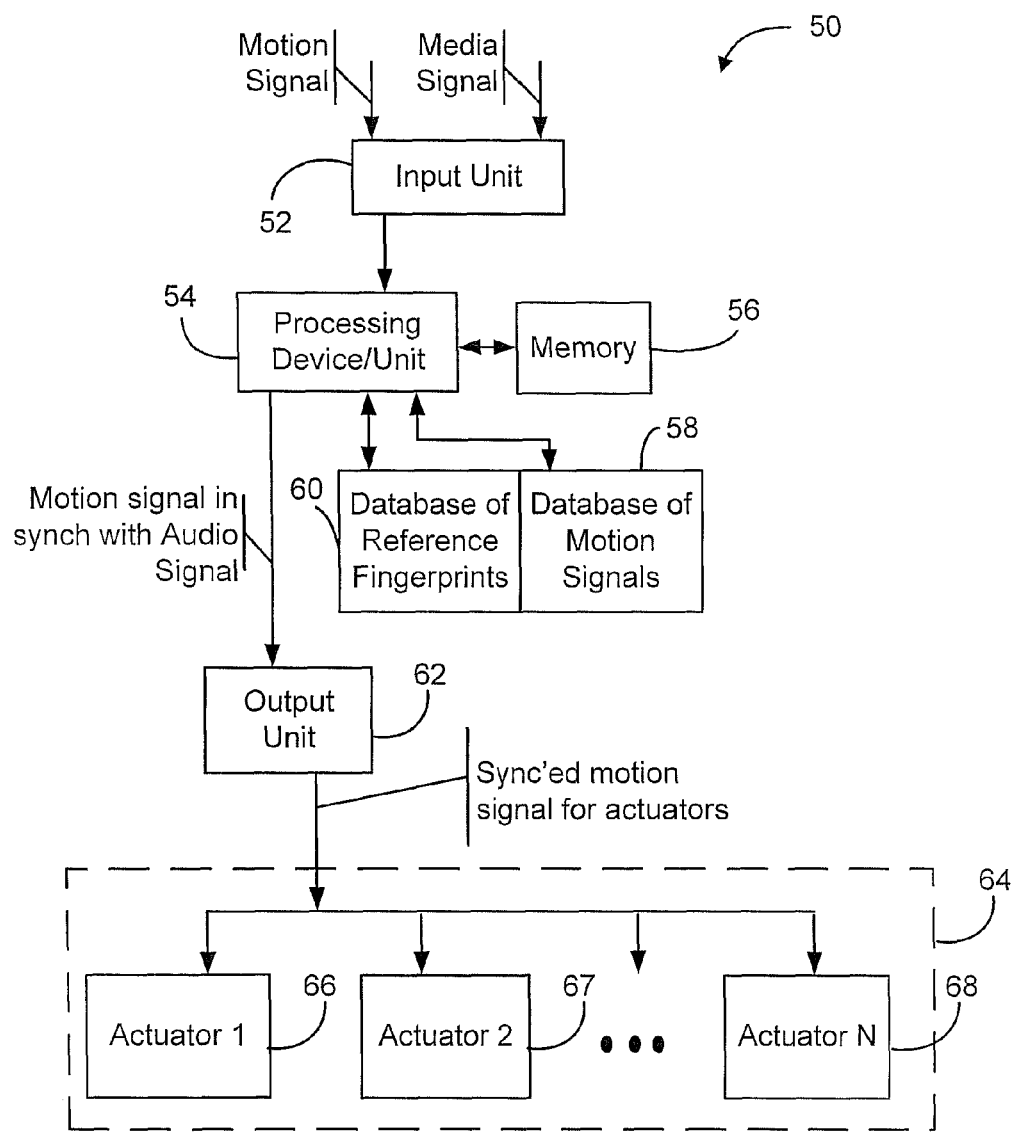
FIG. 3 is a schematic illustration of a device for synchronizing a motion signal to an audio signal, in accordance with an embodiment.

Now referring to FIG. 3, there is shown an embodiment of a device 50 for synchronizing a motion signal for a feature length movie with a media signal.

The device 50 has an input unit 52; a processing unit 54; a memory 56; one or more databases (here databases 58 and 60); and an output unit 62 in communication with a motion feedback system 64 having actuators 1 to N, 66 to 68.

The input unit 52 is for receiving a portion of a media signal.

The databases 58 and 60 are used respectively for storing motion signals and reference media signal fingerprints in association with particular known media content (e.g., a known feature length movie). Such reference fingerprints are identifiers already derived for the known media content, and which are known to be uniquely related to the known media content.

The processing unit 54 is in communication with the input unit 52 and the databases 58 and 60, as well as with the memory 56. The memory 56 is thus accessible by the processing unit 54.

In one embodiment, the memory 56 is used to store instructions for implementing the processing unit 54 to perform a series of steps on the media signal which involve access and retrieval of data from the databases 58 and 60, as well as processing steps allowing the synchronisation of a motion signal with the media signal. The processing unit 54 is also in communication with the output unit 62 such that the motion signal, once retrieved and synchronized, are sent out either for storage on a database (not shown), or directly to a motion feedback system 64 during playback of the media signal.

Once the portion of the media signal is received at the processing unit 54, via its transmission from the input unit 52, the processing unit 54 obtains a fingerprint corresponding to the received portion of the media signal.

The processing unit 54 then proceeds to identify, from reference fingerprints associated with time positions of at least one reference media content, a reference time position of the media content corresponding to the obtained fingerprint. For example, to perform such comparison, the processing unit 54 accesses the database 60 of reference fingerprints; parses them via optional retrieval of data to an optional internal memory (not shown) until a match is detected between a reference media signal fingerprint and the fingerprint of the media signal. When no match is detected, an error signal is sent out to a user interface (not shown).

Then the processing device obtains the motion signal associated with the identified reference time position of the media content.

Then, based on the identified reference time position of the media content, the processing device is able to synchronize and output the motion signal with the media signal. For example, to do so, the processing unit 54 retrieves and sends the motion signal from the database 58 starting at the reference time position that corresponds to the reference time of the media signal received at input unit 52. The motion signal which is sent at output unit 62 is therefore synchronized with the playback time position of the media signal.

According to another embodiment, there is provided a non-transitory computer readable memory (not shown) having recorded thereon statements and instructions for execution by a computer to carry out a method for synchronizing a motion signal corresponding to a media content with a media signal for the media content. The motion signal is for controlling a motion feedback system. The method comprises method 20 shown in FIG. 1.

Finally, according to another embodiment, there is provided a non-transitory computer readable memory (not shown) having recorded thereon statements and instructions for execution by a computer to carry out a method for determining if a motion signal corresponding to a media content is synchronized to a media signal for the media content. The motion signal is for controlling a motion feedback system. The method comprises method 100 shown in FIG. 2.

While embodiments have been described above and illustrated in the accompanying drawings, it will be evident to those skilled in the art that modifications may be made therein without departing from the scope of this disclosure. Such modifications are considered as possible variants comprised in the scope of the disclosure.

The invention claimed is:

1. A method for synchronizing a motion signal corresponding to a media content with a media signal for the media content, the motion signal for controlling a motion feedback system, the method comprising:
   receiving an identity of a reference media content;
   receiving a portion of the media signal to which the reference media content corresponds;
   obtaining a fingerprint corresponding to the received portion of the media signal;
   from reference fingerprints associated with time positions of the identified reference media content, identifying a reference time position of the media content corresponding to the obtained fingerprint;
   obtaining the motion signal associated with the identified reference time position of the media content; and
   outputting the motion signal synchronized with the media signal using the identified reference time position of the media content for controlling the motion feedback system.

2. The method of claim 1, further comprising receiving at least one reference fingerprint associated with the outputted motion signal and stopping the outputting the motion signal when the obtained fingerprint does not match any of the at least one reference fingerprint.

3. The method of claim 1, wherein the media signal comprises at least one of an audio signal and a video signal.

4. The method of claim 3, wherein the media content comprises a feature length movie and the audio signal and the video signal comprise the audio signal and the video signal for a feature length movie.

5. The method of claim 1, wherein the obtaining a fingerprint corresponding to the received portion of the media signal comprises computing the fingerprint of the received portion of the media signal.

6. The method of claim 5, wherein the computing the fingerprint comprises applying a media fingerprinting technique to generate the fingerprint as a coded identifier uniquely representative of the media content at the reference time position.

7. The method of claim 6, wherein the identifying a reference time position of the media content comprises consulting a database comprising coded identifiers for the reference fingerprints to which are associated reference time positions and obtaining the reference time position that corresponds to the coded identifier uniquely representative of the media content at the reference time position.

8. The method of claim 1, wherein the identifying the reference time position comprises continuously performing the obtaining a fingerprint, the identifying a reference time position, and the obtaining the motion signal steps to keep outputting the stream of motion signal synchronized with the media signal, thereby ensuring continuous synchronization of the motion signal.

9. The method of claim 1, wherein the identifying the reference time position comprises performing the obtaining a fingerprint, the identifying a reference time position, and the obtaining the motion signal at a given frequency to resynchronize the outputting the motion signal with the media signal.

10. The method of claim 1, further comprising receiving a motion signal corresponding to the media content prior to the identifying a reference time position of the media content, wherein the reference fingerprints are retrieved directly from the received motion signal.

11. The method of claim 1, wherein the identifying a reference time position of the media content takes place on a remote networked server.

12. The method of claim 1, wherein the motion signal associated with the identified reference time position of the media content is obtained from a remote networked server.

13. A method for determining if a motion signal corresponding to a media content is synchronized to a media signal for the media content, the motion signal for controlling a motion feedback system, the method comprising:
   receiving an identity of a reference media content;
   receiving a portion of the media signal to which the reference media content corresponds;
   obtaining a fingerprint of the received portion of the media signal, namely an obtained fingerprint;
   retrieving a fingerprint of the portion of the media signal at a reference time position of the reference media content, namely a reference fingerprint;
   comparing the obtained fingerprint and the reference fingerprint;
   based on the comparing, determining if the motion signal is synchronized to the media signal; and
   according to the determining, outputting the motion signal synchronized with the media signal for controlling the motion feedback system.

14. The method of claim 13, wherein the reference fingerprint is retrieved from a database comprising reference fingerprints associated with time positions for the reference media content.

15. The method of claim 14, wherein the reference fingerprint is retrieved directly from the motion signal.

16. A device for synchronizing a motion signal corresponding to a media content with a media signal for the media content, the device having access to a storage medium which comprises reference fingerprints associated with time positions of at least one reference media content, the motion signal for controlling a motion feedback system, the device comprising:
   an input unit for receiving a portion of the media signal and an identity of a reference media content corresponding to the media signal;
   a processing device in communication with the input unit and the storage medium; and
   a memory accessible by the processing device, the memory storing instructions for implementing the processing device to:
   obtain a fingerprint corresponding to the received portion of the media signal;

from reference fingerprints associated with time positions of the identified reference media content, identify a reference time position of the media content corresponding to the obtained fingerprint;

obtain the motion signal associated with the identified reference time position of the media content; and output the motion signal synchronized with the media signal using the identified reference time position of the media content for controlling the motion feedback system.

17. A non-transitory computer readable memory having recorded thereon statements and instructions for execution by a computer to carry out a method for synchronizing a motion signal corresponding to a media content with a media signal for the media content, the motion signal for controlling a motion feedback system, the method comprising:

receiving a portion of the media signal and an identity of a reference media content corresponding to the media signal;

obtaining a fingerprint corresponding to the received portion of the media signal;

from reference fingerprints associated with time positions of the identified reference media content, identifying a reference time position of the media content corresponding to the obtained fingerprint;

obtaining the motion signal associated with the identified reference time position of the media content; and outputting the motion signal synchronized with the media signal using the identified reference time position of the media content for controlling the motion feedback system.

* * * * *